United States Patent
Davidek et al.

(10) Patent No.: US 9,005,689 B2
(45) Date of Patent: Apr. 14, 2015

(54) PROCESS FOR THE PREPARATION OF A FLAVOR ACTIVE COMPOSITION

(75) Inventors: Tomas Davidek, Correvon (CH); Imre Blank, Savigny (CH); Thomas Hofmann, Neufahrn (DE); Peter Schieberle, Zolling (DE)

(73) Assignee: Nestec S.A., Vevey (CH)

( * ) Notice: Subject to any disclaimer, the term of this patent is extended or adjusted under 35 U.S.C. 154(b) by 367 days.

(21) Appl. No.: 13/390,177

(22) PCT Filed: Jul. 7, 2010

(86) PCT No.: PCT/EP2010/059683
§ 371 (c)(1),
(2), (4) Date: Feb. 13, 2012

(87) PCT Pub. No.: WO2011/018280
PCT Pub. Date: Feb. 17, 2011

(65) Prior Publication Data
US 2012/0141643 A1    Jun. 7, 2012

(30) Foreign Application Priority Data
Aug. 13, 2009  (EP) .................................... 09167771

(51) Int. Cl.
A23L 1/22     (2006.01)
A23L 1/227    (2006.01)
A23K 1/16     (2006.01)

(52) U.S. Cl.
CPC ............. *A23L 1/2275* (2013.01); *A23K 1/1634* (2013.01)

(58) Field of Classification Search
USPC .......... 426/520, 534, 535, 536, 537, 538, 650
See application file for complete search history.

(56) References Cited

U.S. PATENT DOCUMENTS

2002/0090733 A1    7/2002    Klaffke et al.

FOREIGN PATENT DOCUMENTS

| GB | 1232719 | 5/1971 |
|---|---|---|
| RU | 2318394 | 3/2008 |
| WO | WO 9842208 | 10/1998 |
| WO | WO 2005019165 | 3/2005 |

OTHER PUBLICATIONS

Wang et al, "Formation of 2, 5-dimethyl-4-hydroxy-3(2H)-furanone through methylglyoxal: a Maillard reaction intermediate," Journal of Agricultural and Food Chemistry, vol. 56, No. 16, 2008, pp. 7405-7409, XP002564376.
Kerler et al, "alpha-Acetyl-N-heterocycles in the maillard reaction"; Food Reviews International, vol. 13, No. 4, Nov. 1, 1997, pp. 553-575, XP009127919.
Adams et al, "Chemistry of 2-acetyl-1-pyrroline, 6-acetyl-1, 2, 3, 4-tetrahydropyridine, 2-acetyl-2-thiazoline, and 5-acetyl-2, 3-dihydro-4H-thiazine: extraordinary Maillard flavor compounds," Chemical Reviews, vol. 106, No. 6, Jun. 2006, pp. 2299-2319, XP002564375.
Search Report for International Application No. PCT/EP2010/059683 mailed Oct. 5, 2010.
Russian Office Action for Application No. 2012109407, Dated Sep. 12, 2014, 6 pages.

*Primary Examiner* — Leslie Wong
(74) *Attorney, Agent, or Firm* — K&L Gates LLP

(57) ABSTRACT

The invention concerns a flavor active composition obtainable by a multi-step reaction comprising a first reaction between an amino compound and a carbonyl compound to obtain a first intermediate reaction mixture, a second reaction with a second amino compound alone or in combination with a carbonyl compound to obtain a second intermediate reaction mixture, further separate reactions with another amino compound alone or in combination with a carbonyl compound to obtain further intermediate reaction mixture, further separate reactions with compounds from other chemical classes such as alcohols, phenolic compounds, epoxydes or organic acids and combinations thereof leading to suitable intermediates, a last reaction comprising a mixture of all the preceding intermediate mixtures alone or in combination with amino and/or carbonyl compounds to obtain the final flavor composition.

4 Claims, 4 Drawing Sheets

Multi step approach
Step 1: Mix 1 - Glc/Glu, pH 7, 100°C / 30 min
Step 2: Mix 2 – Cys, pH 9, 100°C / 6 h
Step 3: Mix 1 + Mix 2, pH 7, 100°C / 120 min

Single step approach
Step 1: Mix 1 - Glc/Glu/cys, pH 7, 100°C / 120 min

Formation of 2-acetyl-2-thiazoline:

Cysteamine    Methylglyoxal (MeGlx)

2-AT

Formation of 5-acetyl-2,3-dihydro-1,4-thiazine:

Cysteamine   2,3-butanedione

ADHT

FIG. 9

One step reaction:

Weakness: Only one set of reaction conditions can be used

Multi step reaction:

Controlled intermediate formation

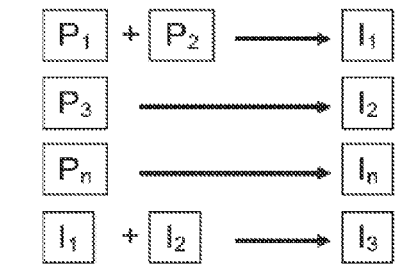

Conversion of intermediates to flavour

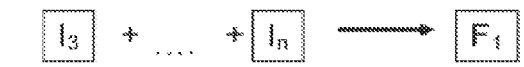

Benefit: Different reaction conditions may be applied for each reaction step to enhance the formation of specific intermediates ($I_1$-$I_n$) from individual precursors ($P_1$-$P_n$) and of the desirable flavour compounds (F) from intermediates.

PROCESS FOR THE PREPARATION OF A FLAVOR ACTIVE COMPOSITION

CROSS REFERENCE TO RELATED APPLICATIONS

The present application is a National Stage of International Application No. PCT/EP2010/059683, filed on Jul. 7, 2010, which claims priority to European Patent Application No. 09167771.6, filed on Aug. 13, 2009, the entire contents of which are being incorporated herein by reference.

FIELD OF THE INVENTION

The present invention concerns a flavour active composition, as well as its use in food and petfood and the process for its preparation.

BACKGROUND OF THE INVENTION

The Maillard reaction is a complex network of reactions that alters important food attributes such as flavour, colour, nutrition value, antioxidant properties, etc. It is used by the food and flavour industry to generate flavour during processing (in-process flavour generation) and to produce process/reaction flavours. However, the control of the Maillard reaction is very challenging as the composition of the reaction products (both qualitative and quantitative) strongly depends on the reaction/processing conditions such as temperature, time, pH, water activity type of reactants etc. The control of the flavour generated during the Maillard reaction is even more challenging as the odorants are generally formed by side reactions and in very low yields. Increasing the yield of key odorants through better reaction control would significantly improve the flavour quality of thermally processed foods and/or process flavours as well as the cost efficiency of flavour precursors systems. This could be achieved by performing the reaction in several steps as opposed to one step reaction. The concept can be applied to process flavours but also to foods, petfoods and beverages. The Maillard reaction together with lipid oxidation plays an essential role in the flavour generation during food processing, and in production of process flavours. In a common approach, the process flavours are prepared by mixing of all the ingredients at once while applying the optimised reaction conditions. However the optimisation of the reaction conditions is generally an issue, because flavour compounds are typically formed by side reactions in the later stages of the Maillard reaction via a cascade of reaction steps.

Several intermediates are often necessary to form a specific flavour compound. In many cases, the optimal reaction conditions for the generation of one group of intermediates are not optimal or not even suitable for the generation of other groups of intermediates. However, formation of all intermediates is essential. If one or several intermediates are missing or are formed in low amounts, the formation of the flavour compound is limited or inhibited. This is often the case, when the Maillard reaction is performed in one step. In this approach, the reaction conditions must permit the formation of all the intermediates. As a consequence, the reaction conditions are not optimal for the generation of individual intermediates which results in low yields of flavour compounds (odorants, tastants).

Low yields of flavour compounds together with high prices of certain precursors often hinder the broader use of flavour precursors during food processing and in the production of process flavours. There is thus a need to enhance the conversion of flavour precursors into flavour active compounds to improve the cost efficiency of the precursors.

SUMMARY

Generation of flavour active compounds in two or more steps may be an alternative approach to that using only one reaction step. This new approach consists in controlled formation of intermediates in first step(s) followed by formation of flavour compounds in follow up step(s).

BRIEF DESCRIPTION OF THE DRAWINGS

FIG. 9 is a schematic diagram comparing an embodiment of a multi-step reaction according to the present disclosure to a single step reaction.

DETAILED DESCRIPTION

Figure 1:
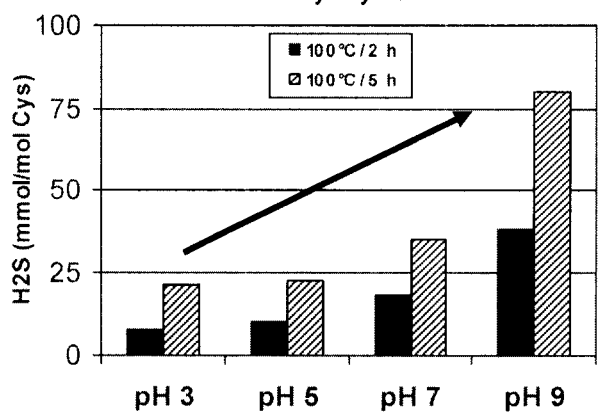
FIG. 1 is a graph showing the impact of pH on the formation of H2S in a Glc/Cys system.

The present invention concerns a flavour active composition obtainable by a multi-step reaction comprising a first reaction between an amino compound and a carbonyl compound to obtain a first intermediate reaction mixture, a second reaction with a second amino compound alone or in combination with a carbonyl compound to obtain a second intermediate reaction mixture, further separate reactions with another amino compound alone or in combination with a carbonyl compound to obtain further intermediate reaction mixture, further separate reactions with compounds from other chemical classes such as alcohols, phenolic compounds, epoxydes or organic acids and combinations thereof leading to suitable intermediates, a last reaction comprising a mixture of all the preceding intermediate mixtures alone or in combination with amino and/or carbonyl compounds to obtain the final flavour composition.

As shown in FIG. 9, the advantage of this multi step reaction process stems from the fact that different reaction conditions may be applied for different reaction steps. Consequently, each reaction step may be optimised for generation of a specific intermediate or group of intermediates. This leads to improved yields of individual intermediates as compared to reaction in one step, namely when the different intermediates require different reaction conditions (e.g. $I_1$ requires low pH and short reaction times, whereas $I_2$ requires high pH and long reaction times). Apart the optimisation of the reaction parameters for each intermediate, the multistep approach also permits the optimisation of reaction conditions for the conversion of intermediates into flavour active compounds. Contrary to a one step reaction where the optimisation of the reaction parameters must be done for the whole system, the multistep reaction process permits to use optimal reaction parameters for each reaction step resulting in better yield of flavour compounds and better flavour modulation capabilities.

It is possible according to the invention to have for example a classical Maillard reaction between an amino compound and a carbonyl compound, but also a pure degradation of an amino compound or compound from other chemical class (e.g. alcohols, phenolic compounds, epoxydes or organic acids) and then a reaction between these reaction mixtures.

Under compounds from other chemical classes we understand alcohols which can be for example oxidized to carbonyl compounds, phenolic compounds such as phenols and polyphenols which can be transformed to quinones, epoxydes which can be transformed to diols and to dicarbonyl compounds and organic acids which can be decarboxylated such as pyruvic acid or oxidised such as fatty acids.

According to the invention the amino compound is taken from the group consisting of amino acid, amine, sources of amino acids such as peptides, proteins, their hydrolysates or extracts, hydrolysed vegetable protein, yeast extracts, yeast hydrolysates, soy sauces and mixtures thereof.

In the case of an amino acid, this latter is taken from the group consisting of cysteine, cystine, methionine, proline, ornithine, arginine, valine, leucine, isoleucine, phenylalanine, lysine, glycine, glutamic acid and threonine. The most preferred amino acids are cysteine, cystine, methionine, proline, leucine, phenylalanine and glutamic acid. The proteins are taken from the group consisting of soy protein, sodium caseinate, whey protein and wheat gluten.

According to the invention, the carbonyl compound is taken from the group consisting of mono- and disaccharide, sugar derivatives such as uronic acids, sources of sugar and/or sugar derivatives and their hydrolysates, such as dextrins, glucose syrup, fructose syrup, xylose syrup, hydrolysed pectins and Maillard reaction intermediates bearing at least one carbonyl group such as aldehydes, ketones, alpha-hydroxycarbonyl or dicarbonyl compounds. Preferred carbonyl sources are: pentoses (xylose, arabinose and ribose), hexoses (glucose, fructose, mannose, galactose), 6-deoxyhexoses (rhamnose, fucose), disaccharides (lactose and maltose), uronic acids (galacturonic acid), glucose syrup, fructose syrup and hydrolysed pectine. The most preferred carbonyl compounds are xylose, glucose, fructose, rhamnose and lactose.

Usually the number of reactions for producing the composition is of 1 to 4 before the last reaction.

The reactions are carried out either in an aqueous, a lipid or a structured lipid phase environment. In the case of an aqueous reaction, the amount of water is comprised between 5 and 99% in weight, most preferably it is comprised between 60 and 90%. In the case of a lipid environment, said lipid is derived from a plant or animal that is an edible or comestible lipid for example soy oil, sunflower oil, palm oil, cotton seed oil, rapeseed oil, coconut oil, corn oil, canola oil, olive oil, beef tallow, lamb tallow, lard, poultry fat, chicken fat, or any combination thereof. In the case of a structured lipid phase environment, the reaction is carried out following the knowledge of patent application filed under number PCT/US09/03711.

As already mentioned before, different reaction conditions are applied for different reaction steps. The temperature of the reaction is usually comprised between 60 and 180° C., preferably between 80 to 150° C., most preferably between 90 and 130° C. The duration of the reaction is comprised between 1 minute and 12 hours, preferably between 15 min and 6 hours, most preferably between 0.5 and 2 hours. The pH is comprised between 2 and 9.

In a preferred embodiment, the reaction mixtures may comprise one or more catalyst to enhance the rate of the Maillard reactions. For example, the catalyst is a compound comprising a phosphate or a carboxylate group, such as disodium hydrogen phosphate or citric acid. It is also possible to add to the reaction mixtures a compound for adjusting the pH of the aqueous, lipid or structured lipid phase. This compound is for example a buffer, such as phosphate buffer, or sodium hydroxide. The present invention concerns further the use of the flavour active composition, wherein said composition is added in an amount comprised between 0.05 and 10% in weight into foods and petfoods. Preferably, said composition is added in an amount comprised between 1 and 3% in culinary food preparations (such as sauces, soups, gravies, stocks, seasonings, savory thermal bases), baked foods, extruded foods, snacks, beverages as well as petfoods.

The invention concerns finally the process for the preparation of the flavour active composition, comprising a first reaction between an amino compound and a carbonyl compound to obtain a first intermediate reaction mixture, a second reaction with a second amino compound alone or in combination with a carbonyl compound to obtain a second intermediate reaction mixture, further separate reactions with another amino compound alone or in combination with a carbonyl compound to obtain further intermediate reaction mixtures, further separate reactions with compounds from other chemical classes such as alcohols, phenolic compounds, epoxydes or organic acids and combinations thereof leading to suitable intermediates, a last reaction comprising a mixture of all the preceding intermediate mixtures alone or in combination with amino and/or carbonyl compounds to obtain the final flavour composition.

According to a possible embodiment of the invention, the last reaction is carried out directly in the food or petfood during processing, such as extrusion, roller drying baking, cooking, retorting, microwave heating, toasting, frying.

The following general examples are given to deliver different flavour notes.

Example 1

Roasty/Popcorn

In a step 1, glucose and glutamic acid or lysine are reacted at pH 7 to generate methylglyoxal. In the step 2, the intermediates of step 1 are mixed with proline or ornithine to generate 2-acetyltetrahydropyridine and 2-acetyl-1-pyrroline giving a toasty-popcorn flavour.

Example 2

Biscuit Note

In the first step, rhamnose and lysine are reacted at pH 7 to generate furanones such as 4-hydroxy-2,5-dimethyl-3(2H)-furanone (HDMF) and other carbonyls (e.g. acetylformoine). In a second step, the intermediates of step 1 are mixed with proline or ornithine to generate biscuit flavour notes.

Example 3

Chocolate Note

In the first step, rhamnose and lysine are reacted at pH 7 to generate furanones such as 4-hydroxy-2,5-dimethyl-3(2H)- furanone (HDMF) and other carbonyls (e.g. acetylformoine). In a second step, the intermediates of step 1 are reacted with phenylalanine and leucine to generate chocolate flavour notes.

The examples mentioned below will illustrate more precisely the impact of multi step approach on formation of selected odorants and the sensory profile of reaction mixtures.

Example 4

The concentration of 2-furfurylthiol (FFT), an impact odorant of many thermally processed foods including the coffee and meat, could be significantly increased when the reaction of glucose with glutamic acid and cysteine was performed using multistep approach. The reaction done by the classical single step approach yielded only 2.3 μg FFT/mol cysteine after heating of all three precursors (each 0.4 mol/L) in phosphate buffer (0.5 mol/L; pH 7) at 100° C. for 2 hours. The low yield can be explained by the formation FFT through interaction of 2-furaldehyde with hydrogensulfide:

2-Furaldehyde is a well known degradation product of monosaccharides formed through 1,2-enolisation pathway which is favoured at low pH values. On the other hand, the formation of hydrogen sulfide from cysteine is favoured under alkaline conditions (about 4× more hydrogensulfide was formed in glucose/cysteine after 5 hours at 100° C. at pH 9 compared to pH 3) as it appears on FIG. 1.

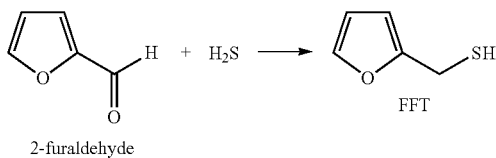

Consequently, single step reaction must employ neutral pH which permits formation of both intermediates (2-furaldehyde and hydrogensulfide), however, these conditions are not optimal for either of them which results in low yield of FFT.

Figure 2:
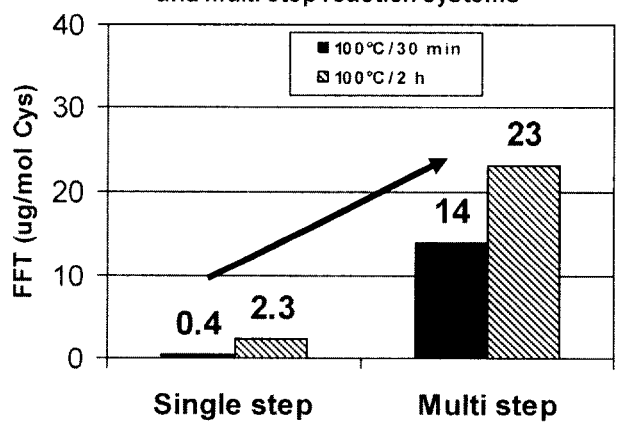
FIG. 2 is a graph showing generation of FFT in single step and multi-step reaction systems examined in Example 4.

The yield of FFT can be significantly increased if the multistep concept is applied. For example, the yield of FFT was 10 fold higher (23 μg/mol cysteine) when the same precursors were reacted in 3 steps instead of one. First, glucose was reacted with glutamic acid (each 0.8 mol/L) in phosphate buffer (0.5 mol/L; pH 7) at 100° C. for 30 min (step 1: conversion of glucose to 2-furaldehyde). In another reaction a solution of cysteine (0.8 mol/L) was heated in phosphate buffer (0.5 mol/L; pH 9) at 100° C. for 6 hours (step 2: conversion of cysteine to hydrogen sulphide). And finally, the reaction mixtures obtained from step 1 and step 2 were mixed together (ratio 1:1) and after adjusting pH value to pH 7 heated at 100° C. for 2 hours (step 3: generation of FFT) (FIG. 2).

Even higher differences were observed after shorter reaction times. After 30 minutes at 100° C. and pH 7 a single step approach yielded only 0.4 μg FFT/mol cysteine, whereas the multi step approach yielded 14 μg FFT/mol cysteine (reaction time in step 3=30 min), i.e. a 35 fold increase.

Figure 3:
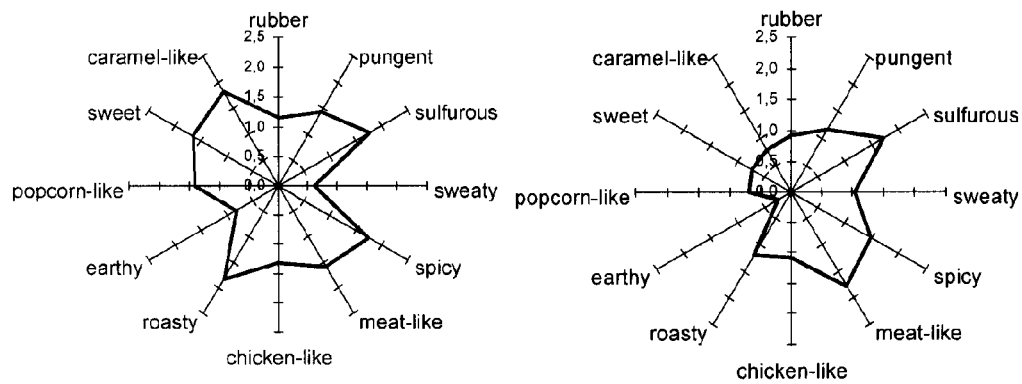
FIG. 3 shows graphs showing flavor profiles in single step and multi-step reaction systems examined in Example 4.

Evaluation of the overall odor revealed that the multistep approach generated a flavour profile significantly higher in roasty, sweet, popcorn and caramel-like notes as compared to the single step approach (FIG. 3).

Thus apart of increasing the yield of flavour active compounds the multistep approach permits a more efficient flavour modulation as compared to the single step approach. This stems from the fact that the same precursors can be used to generate different flavour intermediates via different reaction conditions that can be used for individual reaction steps. This results in modulation of the flavour which is another advantage of the multistep reaction approach.

Example 5

Figure 4:
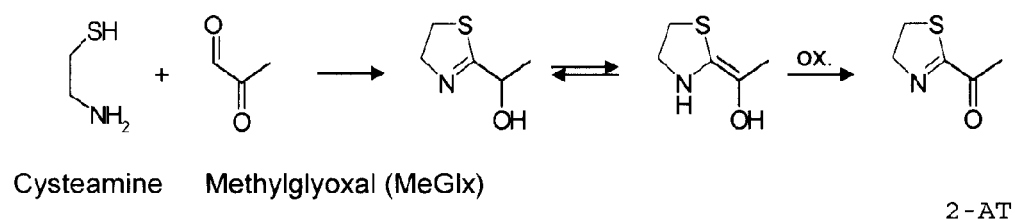
FIG. 4 is a graph showing formation of 2-acetyl-2-thiazoline.
Figure 5:
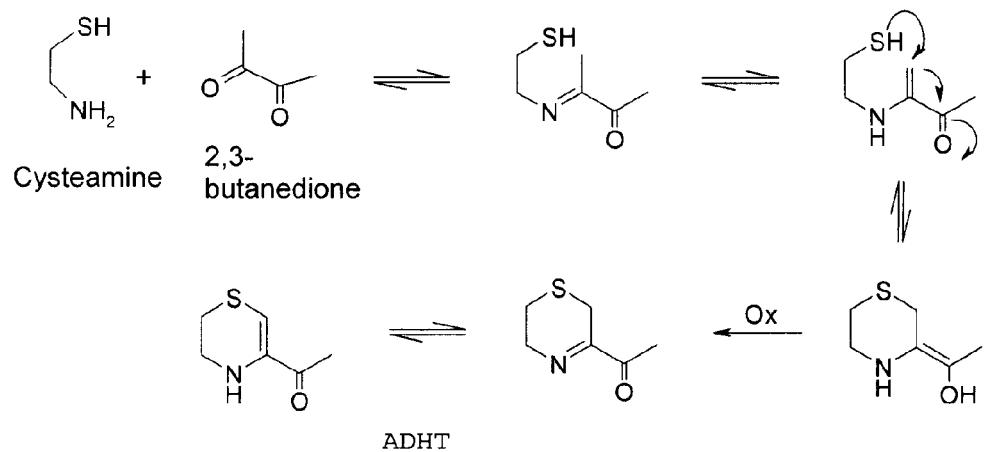
FIG. 5 is a graph showing formation of 5-acetyl-2,3-dihydro-1,4-thiazine.

Similarly to FFT the multi step approach was successfully used to enhance the yield of other odor active compounds, such as 2-acetyl-2-thiazoline (2-AT) and 5-acetyl-2,3-dihydro-1,4-thiazine (ADHT). Both compounds possessing roasty, popcorn like aroma can be formed through the interaction of cysteamine with sugar fragments (methylglyoxal and 2,3-butanedione): FIGS. 4 and 5.

Figure 6:
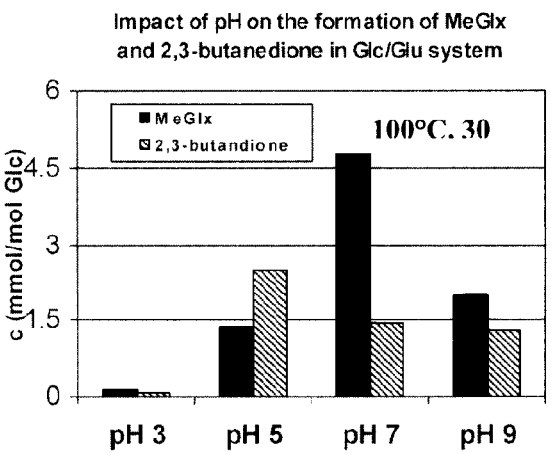
FIG. 6 is a graph showing impact of pH on the formation of MeGix and 2,3-butanedione in Glc/Glu system.
Figure 7:
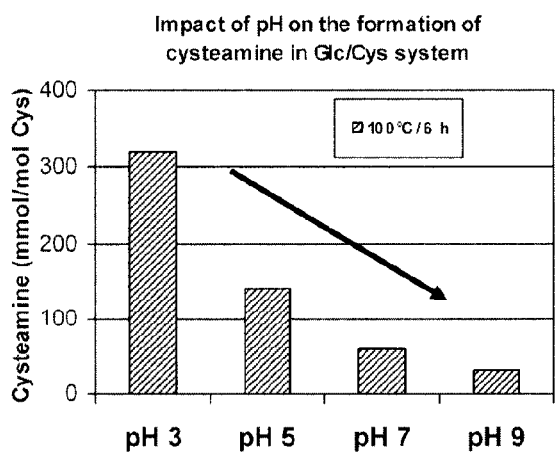
FIG. 7 is a graph showing Impact of pH on the formation of cysteamine in Glc/Cys system.

The fragmentation of sugars increases with increasing pH of the reaction mixture, however the reactivity of the fragments also increases with pH. Under acidic conditions the yield of sugar fragments is generally low due to the low formation rate. Similarly, under alkaline conditions the yield is also low due to the high degradation rate of these fragments. Therefore, yield of sugar fragments generally reaches the maximum under neutral or slightly alkaline conditions. On the other hand, the generation of cysteamine from cysteine is strongly favoured under acidic conditions (FIGS. 6 and 7).

Due to this pH dependency, a neutral pH seems to be the best compromise to generate 2-AT and ADHT using single step approach. Single step reaction of glucose with glutamic acid and cysteine (each 0.4 mol/L) at pH7 (phosphate buffer, 0.5 mol/L) yielded 17 μg 2-AT and 29 μg ADHT per mol of cysteine after 30 minutes at 100° C.

Figure 8:
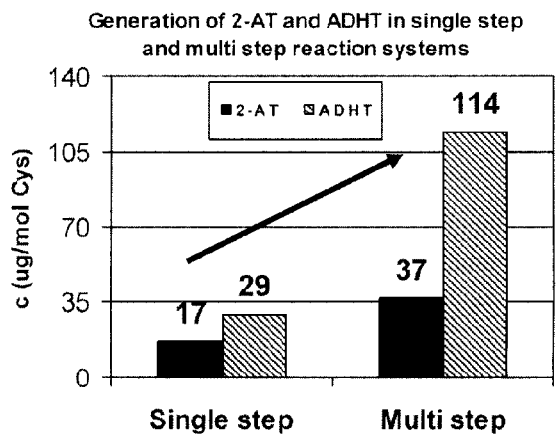
FIG. 8 is a graph showing generation of 2-AT and ADHT in single-step and multi-step reactions as examined in Example 5.

The yield of both compounds could be improved when the multistep reaction approach was applied. The approach consisted in (i) reaction of glucose with glutamic acid (each 0.8 mol/L) in phosphate buffer (0.5 mol/L; pH 7) at 100° C. for 30 min (step 1: generation of sugar fragments); (ii) reaction of cysteine (0.8 mol/L) in phosphate buffer (0.5 mol/L; pH 3) at 100° C. for 6 hours (step 2: generation of cysteamine); and (iii) reaction of mixtures obtained in step 1 and 2 (mixed in ratio 1:1) at 100° C. for 30 min at pH 7 (step 3: generation of odorants). Under these conditions, the yield of 2-AT was increased about twice (37 μg/mol cys) and the yield of ADHT about 4 times (114 μg/mol cys): FIG. 8.

Example 6

A multi step reaction approach was used to prepare flavouring possessing roasty/meaty flavour. Multi-step approach: In a first step xylose and glycine (each 1.5 mol/L) were dissolved in pyrophosphate buffer (0.2 mol/L, pH 5.5), pH of the reaction mixture was adjusted to pH 5.5 and the reaction mixture was heated at 100° C. for 60 min (flavouring B) and 120 min (flavouring C). In a second step, cysteine (1.5 mol/L) was added to the reaction mixture obtained in step 1, the pH of the mixture was adjusted to pH 5.5 and the mixture and was heated at 100° C. for 120 min. For comparison single step reaction was also performed: xylose, glycine and cysteine (each 1.5 mol/L) were dissolved in pyrophosphate buffer (0.2 mol/L, pH 5.5), pH of the reaction mixture was adjusted to pH 5.5 and the reaction mixture was heated at 100° C. for 120 min and 240 minutes (flavouring A). Flavouring B and C gave pleasant well balanced overall flavour which was described as roasted beef (dominating notes being meaty, roasty and caramel). On the other hand, the flavouring A and B developed rather unpleasant flavour with vegetable, sulphury and rubbery notes.

The invention claimed is:

1. A process for the preparation of a flavor active composition comprising performing a first reaction comprising a first amino compound and a first carbonyl compound to obtain a first intermediate reaction mixture;

performing a second reaction comprising a second amino compound alone or in combination with a second carbonyl compound to obtain a second intermediate reaction mixture;

performing a third reaction comprising a third amino compound alone or in combination with a third carbonyl compound to obtain a third intermediate reaction mixture;

performing a fourth reaction comprising compounds selected from the group consisting of alcohols, phenolic compounds, epoxydes, organic acids and combinations thereof leading to a fourth intermediate reaction mixture, each of the first, second, third and fourth reactions is performed at a temperature between 90 and 130° C., during 0.5 to 2 hours at a pH of between 2 and 9 and has a different reaction condition relative to the other reactions, and each of the different reaction conditions is selected from the group consisting of a different temperature, a different time duration, a different pH, and combinations thereof, each of the first, second and third amino compounds is individually selected from the group consisting of amino acid, amine, peptides, proteins, peptide hydrolysates, protein hydrolysates, peptide extracts, protein extracts, hydrolysed vegetable protein, yeast extracts, yeast hydrolysates, soy sauces and mixtures thereof, and each of the first, second and third carbonyl compounds is individually selected from the group consisting of mono-saccharide, di-saccharide, sugar derivatives, sources of sugar, sources of sugar derivatives, sugar hydrolysates, sugar derivative hydrolysates, hydrolysed pectins, and Maillard reaction intermediates bearing at least one carbonyl group;

performing a last reaction comprising a mixture of the first, second, third and fourth intermediate reaction mixtures alone or in combination with other amino and/or carbonyl compounds to obtain the final flavour composition.

2. The process according to claim 1, wherein the last reaction is carried out directly in food or petfood during processing.

3. The process according to claim 2, wherein the processing is selected from the group consisting of extrusion, roller drying baking, cooking, retorting, microwave heating, toasting, roasting, and frying.

4. The process according to claim 1, consisting of the first, second, third, fourth and last reactions.

* * * * *